US011905411B2

(12) United States Patent
Benedict et al.

(10) Patent No.: US 11,905,411 B2
(45) Date of Patent: Feb. 20, 2024

(54) LASER ACTIVATED THERMOSET POWDER BED PRINTING

(71) Applicant: PALO ALTO RESEARCH CENTER INCORPORATED, Palo Alto, CA (US)

(72) Inventors: Michael Benedict, Palo Alto, CA (US); Junhua Wei, Palo Alto, CA (US); Gabriel Iftime, Newark, CA (US)

(73) Assignee: XEROX CORPORATION, Norwalk, CT (US)

( * ) Notice: Subject to any disclaimer, the term of this patent is extended or adjusted under 35 U.S.C. 154(b) by 340 days.

(21) Appl. No.: 17/157,637

(22) Filed: Jan. 25, 2021

(65) Prior Publication Data

US 2022/0235224 A1    Jul. 28, 2022

(51) Int. Cl.
| | |
|---|---|
| C08L 79/02 | (2006.01) |
| C08L 63/00 | (2006.01) |
| C08L 83/04 | (2006.01) |
| C08L 77/00 | (2006.01) |
| C08L 75/04 | (2006.01) |
| C08K 5/1515 | (2006.01) |
| C08K 3/04 | (2006.01) |
| C08K 3/16 | (2006.01) |
| C08K 3/36 | (2006.01) |
| C08K 3/34 | (2006.01) |
| C08K 5/17 | (2006.01) |
| C08K 9/04 | (2006.01) |

(52) U.S. Cl.
CPC .............. *C08L 79/02* (2013.01); *C08K 3/042* (2017.05); *C08K 3/16* (2013.01); *C08K 3/346* (2013.01); *C08K 3/36* (2013.01); *C08K 5/1515* (2013.01); *C08K 5/17* (2013.01); *C08K 9/04* (2013.01); *C08L 63/00* (2013.01); *C08L 75/04* (2013.01); *C08L 77/00* (2013.01); *C08L 83/04* (2013.01)

(58) Field of Classification Search
CPC .......... C08L 83/04; C08L 79/02; C08L 77/00; C08L 75/04; C08L 63/00; C08L 83/00; C08K 9/00; C08K 5/17; C08K 5/1515; C08K 3/36; C08K 3/346; C08K 3/16; C08K 3/046; C08K 3/042; C08K 3/013; C08K 9/04; C08K 3/018; C08G 7/20; C08G 7/21
See application file for complete search history.

(56) References Cited

U.S. PATENT DOCUMENTS

| | | | | |
|---|---|---|---|---|
| 5,855,836 A * | 1/1999 | Leyden | ................. | B29C 64/112 |
| | | | | 106/31.62 |
| 7,601,421 B2 | 10/2009 | Khabashesku et al. | | |
| 7,767,132 B2 * | 8/2010 | Patel | ..................... | B29C 64/165 |
| | | | | 264/460 |
| 9,193,816 B2 * | 11/2015 | Jiang | ........................ | C08L 51/10 |
| 9,718,914 B2 | 8/2017 | Iftime et al. | | |
| 10,138,317 B2 | 11/2018 | Iftime et al. | | |
| 10,906,238 B1 * | 2/2021 | Agarwal | ................ | B33Y 40/10 |
| 11,385,541 B2 * | 7/2022 | Mora Barrios | ....... | C08F 283/10 |
| 11,499,033 B2 * | 11/2022 | Alamri | ..................... | C08J 3/203 |
| 11,512,180 B2 * | 11/2022 | Villacorta Hernandez | .................. | |
| | | | | C08K 7/06 |
| 11,629,276 B2 * | 4/2023 | Desai | ..................... | C09J 163/00 |
| | | | | 525/65 |
| 11,761,689 B1 * | 9/2023 | Stolyarov | ................. | G06F 1/20 |
| | | | | 62/79 |
| 2006/0217482 A1 | 9/2006 | Lukehart | | |
| 2008/0157436 A1 | 7/2008 | Patel et al. | | |
| 2011/0017955 A1 | 1/2011 | Zhamu et al. | | |
| 2012/0065299 A1 | 3/2012 | Lukehart et al. | | |
| 2014/0275323 A1 | 9/2014 | Thibodeau et al. | | |
| 2015/0086881 A1 | 3/2015 | Zhamu | | |
| 2016/0193751 A1 | 7/2016 | Humfeld | | |
| 2017/0058070 A1 * | 3/2017 | Iftime | ................... | C08G 69/02 |
| 2019/0194417 A1 | 6/2019 | Wei et al. | | |
| 2020/0198975 A1 | 6/2020 | Beh et al. | | |
| 2022/0220267 A1 * | 7/2022 | Wei | ........................... | B29B 7/94 |

FOREIGN PATENT DOCUMENTS

| | | | | | |
|---|---|---|---|---|---|
| CA | | 2998668 C | * | 2/2021 | .......... B29C 64/153 |
| WO | WO-02064354 A1 | * | 8/2002 | .......... B29C 64/165 |
| WO | 2003059993 | | 7/2003 | | |
| WO | 2015/184223 | | 12/2015 | | |
| WO | 2016209630 | | 12/2016 | | |
| WO | WO-2017046132 A1 | * | 3/2017 | .......... B29C 64/153 |

(Continued)

OTHER PUBLICATIONS

Sudeep, et al., "Covalently interconnected three-dimensional graphene oxide solids," ACS Nano, American Chemical Society USA, vol. 7, No. 8, Aug. 27, 2013, pp. 7034-7040.

Chronopoulos et al., "High-Yield Alkylation and Arylation of Graphene via Grignard Reaction with Fluorographene," Chemistry of Materials, vol. 29, No. 3, Feb. 14, 2017, pp. 926-930.

Ye, Xiangyuan et al., "Covalent Functionalization of Fluorinated Graphene and Subsequent Application as Water-based Lubricant Additive," ACS Applied Materials and Interfaces, vol. 8, No. 11, Mar. 23, 2016, Mar. 23, 2016.

(Continued)

*Primary Examiner* — Sanza L. McClendon
(74) *Attorney, Agent, or Firm* — Miller Nash LLP

(57) ABSTRACT

A composition of matter includes macroparticles comprising particles of one or more continuous phase matrix materials and functionalized microparticles contained at least partially in the one or more matrix material. A method of manufacturing includes producing macroparticles comprising a continuous phase thermoset matrix material mixed with a thermal initiator, depositing a layer of the matrix material onto a powder bed, applying a focused heat source to the layer of matrix material to selectively cure portions of the layer, repeating the depositing and applying until a final shape is formed, and removing uncured powder from the final shape.

32 Claims, 2 Drawing Sheets

(56) References Cited

FOREIGN PATENT DOCUMENTS

| WO | WO-2017074646 A1 * | 5/2017 | ............ B01J 13/02 |
| WO | 2018080045 | 5/2018 | |
| WO | 2020237161 A1 | 5/2020 | |

OTHER PUBLICATIONS

Feng, Wei et al., "Two-Dimensional Fluorinated Graphene: Synthesis, Structures, Properties and Applications" Advanced Science, vol. 3 (2016), 22 pp.

Chronopoulos, Demetrios D. et al., "Chemistry, properties, and applications of fluorographene," Applied Materials Today, vol. 9 (2017) pp. 60-70.

Novoselov, K.S., et al. "A roadmap for graphene," Nature, vol. 490 (Oct. 11, 2012), pp. 192-200.

Layek, Rama K. et al. "A review on synthesis and properties of polymer functionalized graphene," Polymer, vol. 54 (2013), pp. 5087-5103.

Young, Robert J. "The mechanics of graphene nanocomposites: A review," Composites Science and Technology, vol. 72 (2012), pp. 1459-1476.

Marcano, Daniela C. et al. "Improved Synthesis of Graphene Oxide," ACS Nano, vol. 4, No. 8, (Jul. 22, 2010), pp. 4806-4814.

Ling, Xi et al. "Lighting Up the Raman Signal of Molecules in the Vicinity of Graphene Related Materials," American Chemical Society, vol. 48 (2015), pp. 1862-1870.

Luo, Yuancong et al. "Fabrication of a three-dimensional reinforcement via grafting epoxy functionalized graphene oxide into carbon fibers," Materials Letters 209 (2017), pp. 463-466.

Bao, Chenlu et al. "In situ preparation of functionalized graphene oxide/epoxy nanocomposites with effective reinforcements" J. Materials Chemistry 21 (2011), pp. 13290-132098.

Lu, Shaorong et al. "Epoxy nanocomposites filled with thermotropic liquid crystalline epoxy grafted graphene oxide" RCS Advances 3 (2013) pp. 8915-8923.

Kowalczyk K. and Spychaj, T. "Ionic Liquids as Convenient Latent Hardeners of Epoxy Resigns" Polimery, 48:11-12, (Jan. 1, 2003) pp. 833-835.

Li et al. "Synthesis and characterization of reinforced acrylate photosenstive resin by 2-hydroxyethyl methacrylate-functionalized graphene nanosheets for 3D printing" J. Materials Science (2018) 53, pp. 1874-1886.

Xia et al. "Functionalied graphene serving as free radical scavenger and corrosion protection in gamma-irradiated epoxy composites" Carbon 101 (2016), pp. 315-323.

Wan et al. "Grafting of expoxy chains onto graphene oxide for epoxy composites with improved mechanical and thermal properties," Carbon 69 (2014), pp. 467-480.

Li et al. "Control of the functionality of graphene oxide for its application in epoxy nanocomposites" Polymer 54 (2013) pp. 6437-6446.

Rafiee, M.A. et al. "Enhanced Mechanical Properties of Nanocomposites at Low Graphene Content", ASC NANO, 2009, pp. 3884-3890.

\* cited by examiner

LASER ACTIVATED THERMOSET POWDER BED PRINTING

TECHNICAL FIELD

This disclosure relates to three-dimensional printing, more particularly with three-dimensional printing using powder beds.

BACKGROUND

Three-dimensional manufacturing techniques include many different types of manufacturing including 3D printing, selective laser sintering (SLS), etc. Palo Alto Research Center (PARC) has developed a body of work around linked particle networks. These networks typically comprise polymers with functionalized particles directly linked into a linked particle network. This may involve highly loaded particles, such as those that have high contents of graphene. Liquid inks do not generally work well with higher amount of material, making the use of liquid inks prohibitive. Using solid particles may alleviate that issue.

In laser sintering applications, such as laser based powder bed printing, thermoplastic materials undergo laser treatment that causes the particles to bond together, but they do not crosslink.

SUMMARY

According to aspects illustrated here, there is provided a composition of matter including macroparticles comprising particles of one or more continuous phase matrix materials and functionalized microparticles contained at least partially in the one or more matrix material.

According to aspects illustrate here, there is provided a method of manufacturing including producing macroparticles comprising a continuous phase thermoset matrix material mixed with a thermal initiator, depositing a layer of the matrix material onto a powder bed, applying a focused heat source to the layer of matrix material to selectively cure portions of the layer, repeating the depositing and applying until a final shape is formed, and removing uncured powder from the final shape.

DETAILED DESCRIPTION OF THE EMBODIMENTS

The embodiments here involve a composition of matter and use of that composition in a manufacturing process. As used here, the term "continuous phase" material, or "continuous phase matrix material" means a material that acts as a polymer matrix, with or without particles dispersed within it. The macroparticles may be referred to comprising "one or more" particles, which means that the macroparticles may comprise one or more materials in a mixture of macroparticles, or that the particles themselves may comprise two different materials.

Figure 1:
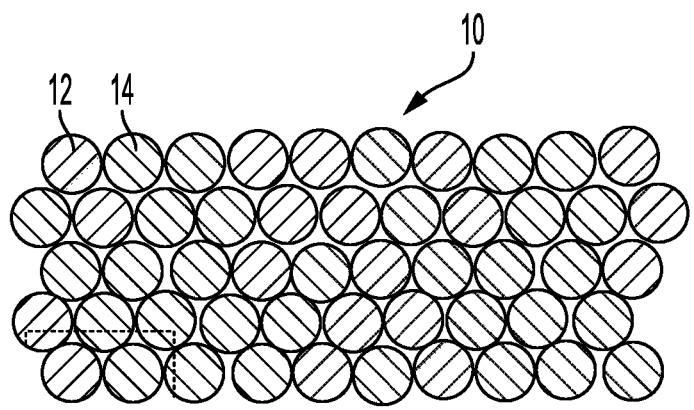
FIG. 1 shows a diagram of an embodiment of a composition of matter.

FIG. 1 shows an embodiment of a composition of matter. In one embodiment, the composition of matter 10 may comprise particles such as 12 and 14 of two different materials. Each particle of the composition of matter may include at least one type of functionalized microparticles contained at least partially in the one or more matrix material. As used here, "at least partially contained" means that the functionalized microparticles reside within the matrix material or some portion of the functionalized microparticles resides within the matrix material.

Figure 2:
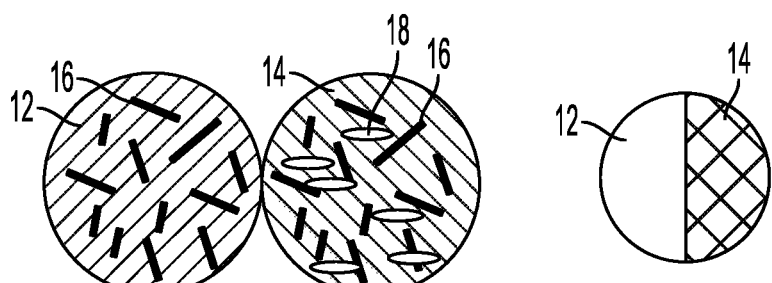
FIG. 2 shows a diagram of an embodiment of particles with microparticles and filler particles.

FIG. 2 shows the particles of the matrix materials that make up the macroparticles. The microparticles, such as 16 and 18, serve to provide some sort of functionality to the macroparticles, allowing them to form linked particle network bonds to others of the particles, resulting in stronger bonds than just heat cured bonds. Macroparticles 12 and 14 may have different microparticles or combinations of microparticles.

The matrix materials making up the macroparticles may be one of several different materials. Referring to FIG. 1, the particles 12 may be one material and particles 14 may be of another. One or the other of the differing particles may comprise an initiator that starts the cross linking reaction. The initiator may comprise a thermal initiator, thermal radical initiator, thermal cationic initiator, photo radical initiator, and photo anionic initiator.

The matrix materials may comprise one of many materials including amines, epoxies, and solid monomers in combination or not with one of the initiators mentioned above. If the one or more matrix materials comprise a solid monomer and an initiator, the solid monomer may comprise the bulk of the macroparticles, such as up to 95 wt % with the initiator comprising at least 5 wt %.

If one of the matrix materials comprises an amine, for example, the functionalized materials may comprise amines, epoxies, and graphene. Similarly, if one or more of the matrix materials comprises an epoxy, the microparticles may comprise an epoxy or functionalized graphene.

Examples may include: one or matrix materials comprising an amine and the functionalized microparticles comprise amine functionalized particles; the one or more matrix materials comprises an epoxy and the functionalized particles comprises epoxy functionalized particles; the one or more matrix materials comprise an amine and the functionalized microparticles are functionalized graphene; and the one or more matrix materials comprises an epoxy and the microparticle comprises functionalized graphene.

In some embodiments, the one or more matrix materials may comprises two solids that occur in combination. These may include a solid amine and a solid epoxy, solid silicone part A and part B, solid nylon part A and part B, and thermoplastic polyurethane part A and part B.

A further example may include a composition of matter where the one or more matrix materials comprise an amine with amine-reacted fluorographene (ARFG) microparticles, and an epoxy. In one embodiment the amine-reacted fluorographene (ARFG) has a wt % of one of either at least twenty percent or at least forty percent.

In yet another embodiment, the one or more matrix materials may comprise an epoxy and the microparticles comprise functionalized epoxy reacted flurographene (ERFG). In one embodiment the ERFG has a wt % of either at least twenty percent or at least forty percent.

In some embodiments, the composition of matter may include a particle filler. Particle fillers may take many forms, including clay, graphene, and fume silica. These materials may also be used as functionalized microparticles.

Using the composition of matter as set out above, one can implement a manufacturing process similar to SLS. Instead of each layer of powder being fused together, the heat or other energy will instead cause the powder particles to form a linked particle network between the particles, creating a stronger finished product.

Figure 3:
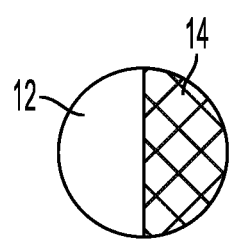
FIG. 3 shows a diagram of an alternative embodiment of a macroparticle.

In one embodiment, the continuous phase matrix powder will include a thermal initiator to cause the cross linking between particles. In addition to the thermal initiator, the particles may include one or more of the continuous phase matrix materials. In one embodiment as shown in FIG. 3, the macroparticles themselves may be made of at least two different materials, 12 and 14. In manufacturing using lasers or other energy sources, one of the two materials may be an initiator.

In one embodiment, the particles result from a solid being ground into particles and then functionalized. Functionalization of the particles may take many forms. Some methods of functionalizing particles can be found in US Patent Pub. 201901944, "Functionalized Graphene Oxide Curable Formulations," filed Dec. 21, 2077, US Patent Pub. 202001989, "Composite Materials Comprising Chemically Linked Fluorographite-Derived Nanoparticles," filed Dec. 19, 2019, incorporated in their entirety herein. The grinding may take the form of cryoscopic grinding of a thermoset material to particles. In one embodiment the particles have a size of less than 100 microns.

Figure 4:
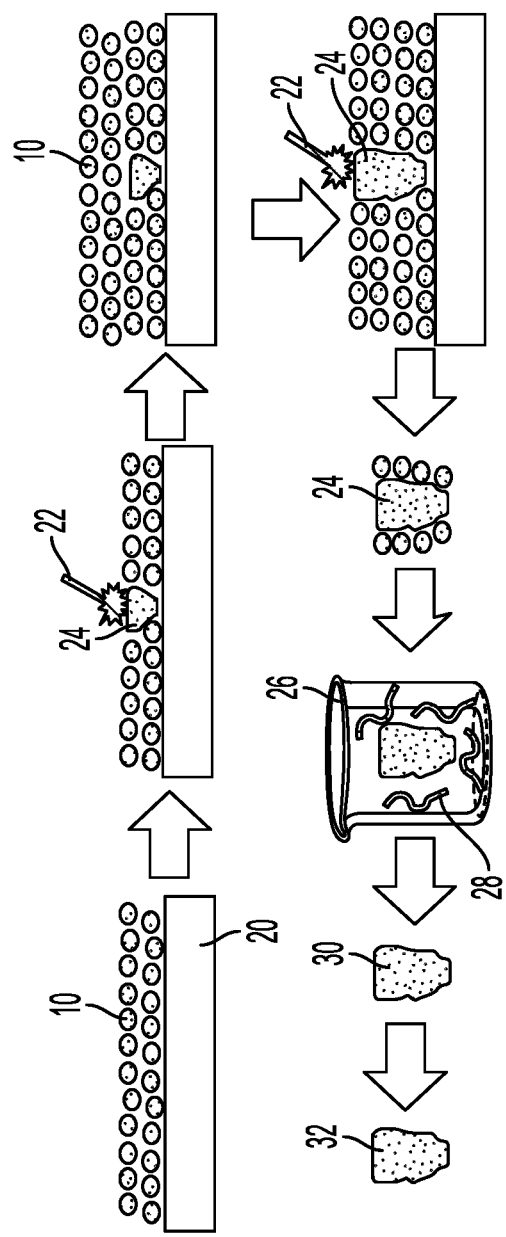
FIG. 4 shows a flowchart of a method of manufacturing a composite material.

FIG. 4 shows a flow chart of a manufacturing process. Beginning in the upper left corner, the powder containing the macroparticles 10 is deposited on a powder bed or other substrate to form a layer of powder. The powder bed may be contained in a chamber that is heated, or may itself be heated. In one embodiment the chamber or bed is heated at slightly above the $T_g$ of the macroparticles in the powder, where $T_g$ is the glass transition temperature, the point at which a material begins to alter state from a rigid, glass-like solid, to a more flexible, pliable compound. This keeps the powder 'sticky' such that it remains in place during cure.

Next, a focused heat source such as 22 then operates on the layer to selectively cure a portion or portions of the layer. The focused heat source will typically comprises a laser. In one embodiment will provide enough energy to convert at least 50% of the selected powder, where conversion means that the molecules at least start to cure.

The portion cured 24 represents the object being manufactured. The final design of the object determines which portion or portions of each layer undergo curing. As shown in FIG. 4, the object comprises a 'solid' object that does not have any separate portions. However, some objects may have portions separate from each other in each layer that undergo curing, to be joined together by later layers that cover all of the portions. The process does not have limit so any particular shape or geometry of any object. One should not infer any limitation.

The process then deposits a new layer of powder as show in the upper right. The source 22 again cures the next layer of the powder in accordance with the shape of the object 24. This process of depositing powder, selectively curing at least a portion, and then repeating continues until the final shape of the object 24 is achieved.

Depending upon the process and the materials used, the process may involve reducing the temperature of the powder bed or the chamber below the glass transition temperature to assist with removal of unused powder. Reducing the 'stickiness' of the uncured powder particles may allow for easier extraction of the finished object 24. Again, depending upon the materials and the overall process, the object 24 may be washed in a bath 26 with a solvent 28. This results in a 'clean' finished object 30. If necessary, the object 30 may also undergo a post-formation cure or sinter at 32.

Other variations and modifications of the process may exist. For example, the macroparticle powder may include a flowability additive to increase the curing of the powder. The particles may also include an absorption additive such as carbon black to increase the energy absorption of the particles when the laser applies heat. Another modification may apply heat from a different source, such as a soldering iron. In some embodiments, the uncured powder may be blown away and no post cure processes are needed.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A composition of matter, comprising:
   macroparticles comprising particles of one or more continuous phase matrix materials; and
   functionalized microparticles embedded in the matrix material, the functionalized microparticles and macroparticles selected such that they form a linked particle network when a focused energy source is applied to the composition.

2. The composition of matter as claimed in claim 1, wherein at least one of the one or more matrix materials comprises an initiator.

3. The composition of matter of claim 2, wherein the initiator comprises one selected from the group comprising: a thermal initiator, thermal radical initiator, thermal cationic initiator, photo radical initiator, and photo anionic initiator.

4. The composition of matter as claimed in claim 1, wherein the one or matrix materials comprise an amine and the functionalized microparticles comprise amine functionalized particles.

5. The composition of matter as claimed in claim 1, wherein the one or more matrix materials comprises an epoxy and the functionalized particles comprises epoxy functionalized particles.

6. The composition of matter as claimed in claim 1, wherein the one or more matrix materials comprise an amine and the functionalized microparticles are functionalized graphene.

7. The composition of matter as claimed in claim 1, wherein the one or more matrix materials comprises an epoxy and the microparticle comprises functionalized graphene.

8. The composition of matter as claimed in claim 1, wherein the one or more matrix materials comprises a solid monomer and a thermal initiator.

9. The composition of matter as claimed in claim 8, wherein the solid monomer comprises 95 wt % of an epoxy monomer and 5 wt % of a thermal initiator.

10. The composition of matter as claimed in claim 1, wherein the one or more matrix materials comprises two solids in combination, the combination selected from the group consisting of: solid amine and solid epoxy, solid silicone part A and part B, solid nylon part A and part B, and thermoplastic polyurethane part A and part B.

11. The composition of matter as claimed in claim 1, wherein the one or more matrix materials comprise an amine with amine-reacted fluorographene microparticles, and an epoxy.

12. The composition of matter as claimed in claim 11, wherein the amine-reacted fluorographene has a wt % of one of either at least twenty percent or at least forty percent.

13. The composition of matter as claimed in claim 1, wherein the one or more matrix materials comprises an epoxy and the microparticles comprise functionalized epoxy reacted fluorographene.

14. The composition of matter as claimed in claim 13, wherein the epoxy-reacted fluorographene has a wt % of one of either at least twenty percent or at least forty percent.

15. The composition of matter as claimed in claim 1, further comprising a particle filler.

16. The composition of matter as claimed in claim 15, wherein the particle filler comprises at least one selected from the group comprising: clay, graphene, and fume silica.

17. The composition of matter as claimed in claim 1, wherein the functionalized microparticles comprise at least one selected from the group consisting of: clay, graphene, and fume silica.

18. A method of manufacturing, comprising:
producing macroparticles comprising a continuous phase thermoset matrix material having functionalized microparticles embedded in the matrix material, mixed with a thermal initiator;
depositing a layer of the matrix material onto a powder bed;
applying a focused heat source to the layer of matrix material to selectively cure portions of the layer;
repeating the depositing and applying until a final shape is formed; and
removing uncured powder from the final shape.

19. The method as claimed in claim 18, wherein the one or matrix materials comprise an amine and the functionalized microparticles comprise amine functionalized particles.

20. The method as claimed in claim 18, wherein the one or more matrix materials comprises an epoxy and the functionalized particles comprises epoxy functionalized particles.

21. The composition of matter as claimed in claim 18, wherein the one or more matrix materials comprise an amine and the functionalized microparticles are functionalized graphene.

22. The composition of matter as claimed in claim 18, wherein the one or more matrix materials comprises an epoxy and the microparticle comprises functionalized graphene.

23. The composition of matter as claimed in claim 18, wherein the one or more matrix materials comprise an amine with amine-reacted fluorographene microparticles, and an epoxy.

24. The composition of matter as claimed in claim 18, wherein the one or more matrix materials comprises an epoxy and the microparticles comprise functionalized epoxy reacted fluorographene.

25. The method as claimed in claim 18, wherein producing a continuous phase thermoset matrix material comprises cryoscopic grinding a thermoset material to particles having a size of less than 100 microns.

26. The method as claimed in claim 18, wherein producing a continuous phase thermoset matrix material comprises producing a solid thermoset powder having at least one flowability additive.

27. The method as claimed in claim 18, wherein producing a continuous phase thermoset matrix material comprises producing a solid thermoset powder having at least one absorption additive.

28. The method as claimed in claim 18, further comprising heating a temperature of the powder bed to higher than a crystallization temperature of the matrix material during the depositing and applying.

29. The method as claimed in claim 18, further comprising lowering the temperature of the powder bed to lower than a crystallization temperature of the matrix material.

30. The method as claimed in claim 18, further comprising cleaning the final shape with a solvent.

31. The method as claimed in claim 18, further comprising performing a cure of the final shape.

32. The method as claimed in claim 18, wherein applying a focused heat source comprises applying one of either a laser source or a soldering iron to the powder.

\* \* \* \* \*